United States Patent
Lin et al.

(10) Patent No.: US 10,196,112 B2
(45) Date of Patent: Feb. 5, 2019

(54) ADAPTIVE OBSERVATION PLATFORM DEVICE FOR SEA SURFACE

(71) Applicant: Dalian University of Technology, Dalian (CN)

(72) Inventors: Yan Lin, Dalian (CN); Xiaoning Jiang, Dalian (CN); Tieli Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 15/870,958

(22) Filed: Jan. 14, 2018

(65) Prior Publication Data
US 2018/0265173 A1   Sep. 20, 2018

(30) Foreign Application Priority Data

Mar. 16, 2017  (CN) .......................... 2017 1 0157910
Mar. 16, 2017  (CN) ..................... 2017 2 0258486 U (51) Int. Cl.
*B63B 35/44*   (2006.01)
*B63B 21/50*   (2006.01)

(52) U.S. Cl.
CPC ............ *B63B 35/44* (2013.01); *B63B 21/508* (2013.01); *B63B 2021/505* (2013.01); *B63B 2035/4426* (2013.01); *B63B 2211/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,879,745 A * | 9/1932 | Henker | ................... | B63B 35/44 114/265 |
| 3,092,852 A * | 6/1963 | Devereux | ............... | B63B 22/18 114/264 |
| 6,942,427 B1 * | 9/2005 | Srinivasan | .............. | B63B 35/44 114/264 |
| 2010/0008733 A1 * | 1/2010 | Stiesdal | .................. | B63B 21/50 405/224 |
| 2011/0140426 A1 * | 6/2011 | Garcia Lopez | ......... | F03D 13/25 290/44 |
| 2015/0329180 A1 * | 11/2015 | Tominaga | ............... | B63B 35/44 114/265 |

(Continued)

*Primary Examiner* — Kyle Armstrong
(74) *Attorney, Agent, or Firm* — Matthias Scholl P.C.; Matthias Scholl (57) ABSTRACT

An observation platform device, including a platform deck, an observation mechanism disposed on the platform deck, a primary swing reduction and self-righting mechanism, and a secondary swing reduction mechanism. The primary swing reduction and self-righting mechanism includes a hollow upper support rod, a solid lower support rod, a buoyant cabin, and a counter weight cabin. The lower support rod includes a lower end fixedly connected to the counter weight cabin, and an upper end fixedly connected to the buoyant cabin. The secondary swing reduction mechanism includes a water pond, a plurality of wing-type supports, and a plurality of spaced fan-shaped floating cabins. The plurality of wing-type supports each includes an upper end fixedly connected to a lower plane of the platform deck, and a lower end fixedly connected to an upper plane of the fan-shaped floating cabins.

5 Claims, 7 Drawing Sheets

(56) References Cited

U.S. PATENT DOCUMENTS

| | | | |
|---|---|---|---|
| 2016/0160836 A1* | 6/2016 | Liu | E02D 27/52 |
| | | | 405/204 |
| 2016/0229494 A1* | 8/2016 | Bergua | B63B 21/502 |
| 2018/0171986 A1* | 6/2018 | Ehrnberg | F03D 3/005 |

* cited by examiner

ADAPTIVE OBSERVATION PLATFORM DEVICE FOR SEA SURFACE

CROSS-REFERENCE TO RELATED APPLICATIONS

Pursuant to 35 U.S.C. § 119 and the Paris Convention Treaty, this application claims foreign priority to Chinese Patent Application No. 201710157910.4 filed Mar. 16, 2017, and to Chinese Patent Application No. 201720258486.8 filed Mar. 16, 2017. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The disclosure relates to an adaptive observation platform device for sea surface.

Description of the Related Art

Typically, sea surface environment monitoring platforms are of a floating type. Optical measurement instruments are loaded on the floating platform to monitor environmental parameters on the sea surface, such as wind, wave, current, etc. Conventional observation platforms are fixed by dynamic positioning. The platforms are bulky, complex, and costly, and have relatively high energy and power consumption, high maintenance cost, and low stability. In addition, the platforms are unable to resist turbulence caused by wind, wave and current.

SUMMARY OF THE INVENTION

In order to overcome the problems existing in the prior art, the disclosure provides an adaptive observation platform device for sea surface. The observation platform device is moderate in size, easy to operate, and can work automatically and adaptively. Furthermore, the observation platform device is highly stable and capable of preventing and reducing swing, and has relatively low maintenance and low energy consumption. Besides carrying optical measurement instruments, the device can also be equipped with other monitoring and detection equipment.

To achieve the above objectives, in accordance with one embodiment of the invention, there is provided an adaptive observation platform device for sea surface, the device comprising a platform deck, an observation mechanism disposed on the platform deck, a primary swing reduction and self-righting mechanism, and a secondary swing reduction mechanism. The primary swing reduction and self-righting mechanism comprises a hollow upper support rod, a solid lower support rod, a buoyant cabin separated by a plurality of watertight bulkheads, and a counter weight cabin separated by a plurality of non-watertight bulkheads. The lower support rod comprises a lower end fixedly connected to the counter weight cabin, and an upper end fixedly connected to the buoyant cabin. The upper support rod comprises a lower end inserted into a sleeve of the buoyant cabin and fixed by a clamp. The secondary swing reduction mechanism comprises a water pond, a plurality of wing-type supports, and a plurality of spaced fan-shaped floating cabins. The plurality of wing-type supports each comprises an upper end fixedly connected to a lower plane of the platform deck, and a lower end fixedly connected to an upper plane of the fan-shaped floating cabins. The upper end of the upper support rod is fixedly connected to a center of a bottom plane of the water pond. Water is added to the water pond, and a combination of the fan-shaped floating cabin, the wing-type support, the platform deck and the observation mechanism floats in the water in the water pond. The center of buoyancy of the observation platform device is located above the center of gravity all the time, and the sea surface is located above the middle between the upper plane of the buoyant cabin and the bottom plane of the water pond. An anchor chain is connected to an upper lug fixed on the buoyant cabin, a lower lug fixed on the counter weight cabin, and a suction anchor disposed on a sea bottom.

In a class of this embodiment, the plurality of wing-type supports and the plurality of fan-shaped floating cabins are both five in number, and five wing-type supports are evenly distributed along angular bisectors of five evenly distributed fan-shaped floating cabins.

In a class of this embodiment, the water surface in the water pond is higher than an upper surface of the fan-shaped floating cabin. The water surface in the water pond is within the range of height of the wing-type support.

In a class of this embodiment, a support platform is fixed on the upper support rod, a plurality of branched support rods is connected to the support platform, and a bottom plane of the water pond is supported by the plurality of branched support rods.

In a class of this embodiment, a plurality of brackets is arranged at joints between the lower support rod and the buoyant cabin, and between the lower support rod and the counter weight cabin.

The work principle of the adaptive observation platform device for sea surface is summarized as follows. The observation platform device is fixed, through the suction anchor and the anchor chain, at a sea area where the marine environment needs to be observed. The buoyant cabin and the counter weight cabin are arranged vertically, the center of buoyancy of the whole device is higher than the center of gravity thereof; as a result, the device has a self-righting property, thereby ensuring that the observation platform device has sufficient stability and a buoyancy security after damage. The support rod is adjustable in length, so that the observation platform is capable of adapting to actual sea conditions in which sea wave parameters are changed continuously. The support rod and the wing-type support structure have a small water-plane-area property, so that the observation platform has a capability of reducing swing. The coordination of the water, the fan-shaped floating cabins and the wing-type support structure in the water pond further improves the capability of preventing and reducing swing of the observation platform. The mechanism of the observation platform device below the sea surface and the mechanism in the water pond provide two stages of attenuation of external interference respectively, allowing the observation platform device to have adaptive stability and stable basic deck plane, so that the optical measurement instruments loaded on the platform deck can work normally and effectively.

Advantages of the adaptive observation platform device for sea surface according to embodiments of the disclosure are as follows. The adaptive observation platform device comprises the platform deck, the observation mechanism, the primary swing reduction and self-righting mechanism, and the secondary swing reduction mechanism. The lower support rod is fixedly connected to the balance weight cabin and the buoyant cabin. The upper support rod is inserted into the sleeve of the buoyant cabin and is fixed by the clamp. The wing-type support has the upper end fixedly connected to the lower plane of the platform deck, and the lower end fixedly connected to the upper plane of the fan-shaped floating cabin. The upper support rod is fixedly connected to the center of the bottom plane of the water pond. Water is added to the water pond, and a combination of the fan-shaped floating cabin, the wing-type support, the platform deck and the observation mechanism floats in the water in the water pond. The center of buoyancy of the observation platform device is located above the center of gravity all the time, and the sea surface is located above the middle between the upper plane of the buoyant cabin and the bottom plane of the water pond. The observation platform device is simple in structure and convenient in use and can work automatically and adaptively; furthermore, the observation platform device has high stability and high capability of preventing swing and reducing swing, has small maintenance workload and saves energy. Besides loading optical measurement instruments, the device can also be used for loading other instrument equipment for monitoring and detection.

In the drawings, the following reference numbers are used: 1—observation mechanism, 2—platform deck, 3—water pond, 4—wing-type support, 5—fan-shaped floating cabin, 6—water surface in water pond, 7—upper support rod, 8—support platform, 9—support rod, 10—buoyant cabin, 11—watertight bulkhead, 12—sleeve, 13—clamp, 14—lower support rod, 15—bracket, 16—counter weight cabin, 17—non-watertight bulkhead, 18—center of buoyancy, 19—center of gravity, 20—upper lug, 21—lower lug, 22—anchor chain, 23—suction anchor, 24—sea bottom, 25—sea surface.

DETAILED DESCRIPTION OF THE EMBODIMENTS

For further illustrating the invention, experiments detailing an adaptive observation platform device for sea surface are described below. It should be noted that the following examples are intended to describe and not to limit the invention.

Figure 1:
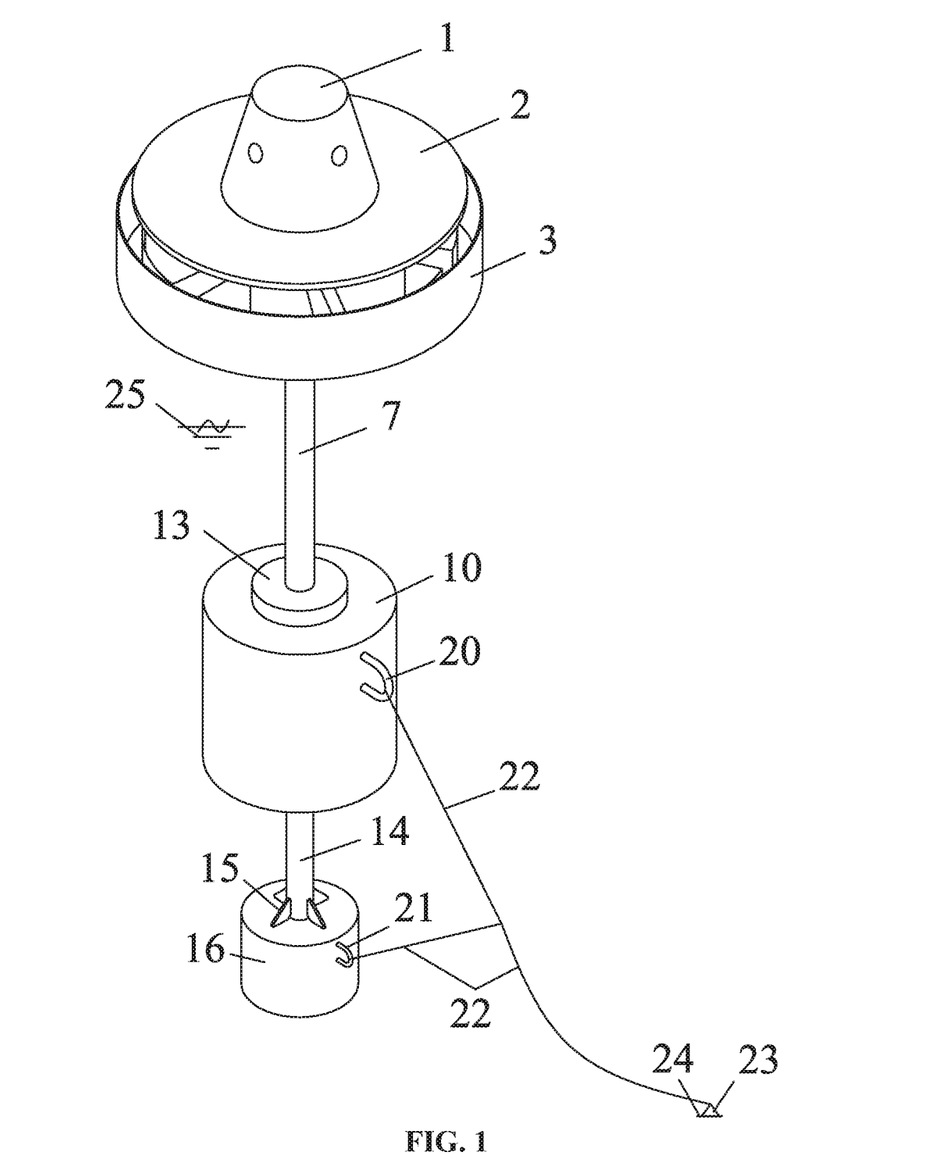
FIG. 1 is a top view of an adaptive observation platform device for sea surface according to embodiments of the disclosure.
Figure 2:
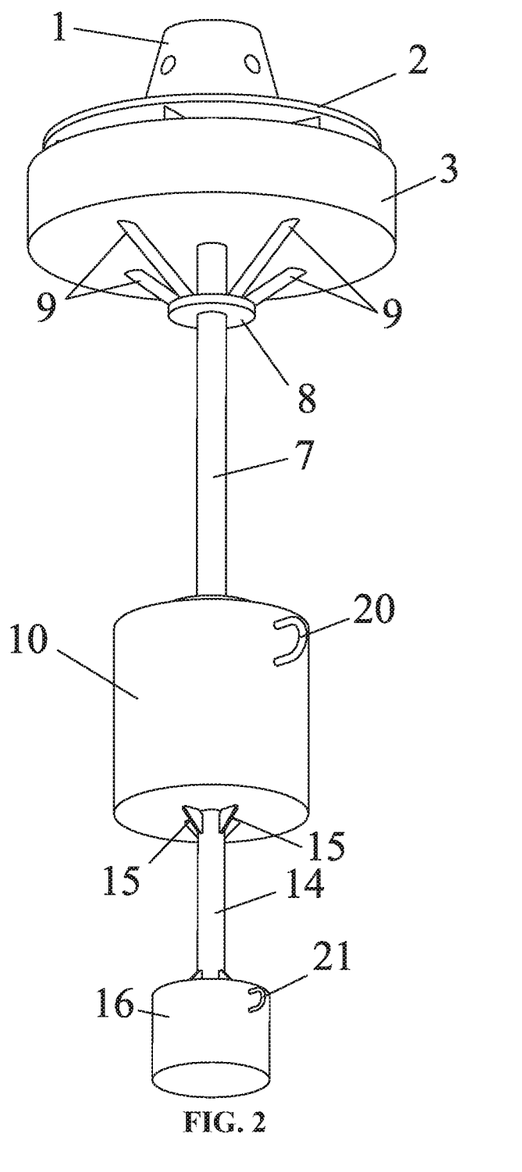
FIG. 2 is a bottom view of an adaptive observation platform device for sea surface according to embodiments of the disclosure.
Figure 3:
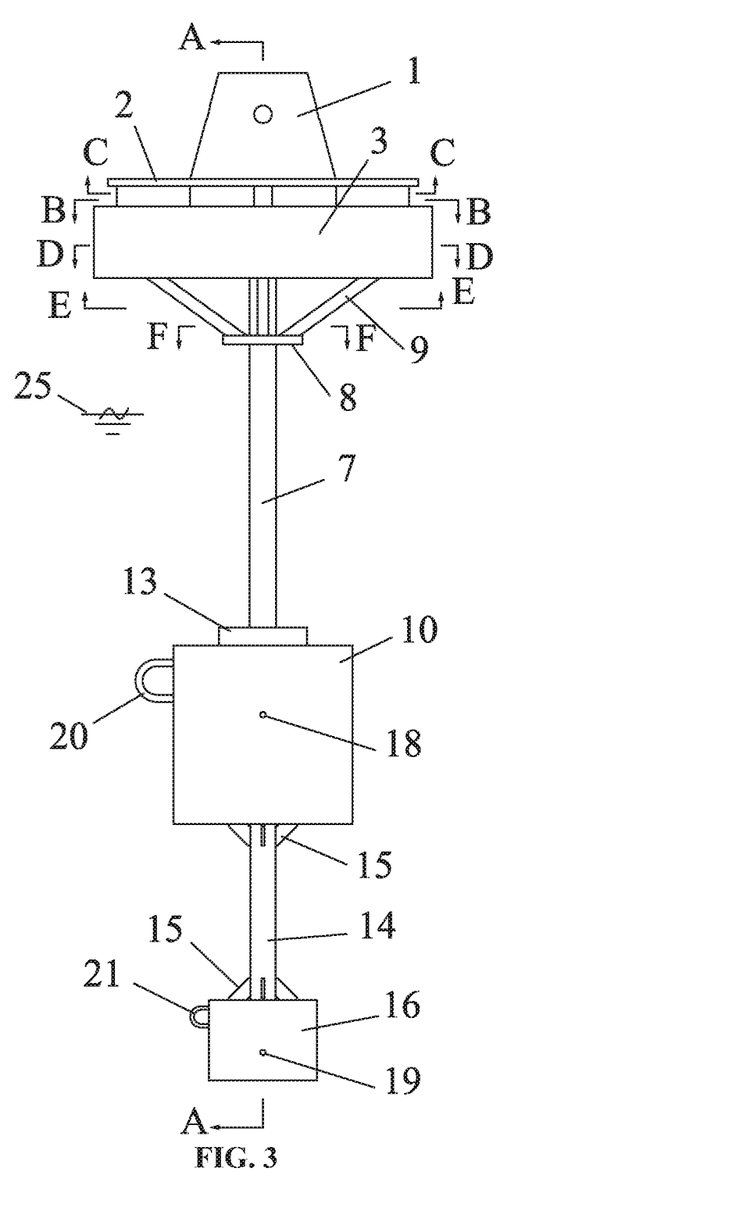
FIG. 3 is a side view of an adaptive observation platform device for sea surface according to embodiments of the disclosure.

FIG. 1 and FIG. 2 are perspective views of an overall structure of an adaptive observation platform device for sea surface. FIG. 3 is a side view of the adaptive observation platform device for sea surface. FIG. 4, FIG. 5, FIG. 6, FIG. 7, FIG. 8 and FIG. 9 are cross-sectional views along lines A-A, B-B, C-C, D-D, E-E and F-F of the adaptive observation platform device for sea surface, respectively. The sea surface observation platform device is an adaptive platform device comprising two stages of swing reduction and self-righting mechanisms. The primary swing reduction and self-righting mechanism is a self-righting mechanism comprising, from the top down, a water pond 3, a buoyant cabin 10, a counter weight cabin 16, which are vertically connected via an upper support rod 7 and a lower support rod 14. The center of buoyancy 18 of the self-righting mechanism is located above the center of gravity 19 thereof all the time (as shown in FIG. 3). The buoyant cabin 10 and the counter weight cabin 16 both are cylindrical and watertight. The upper support rod 7 and the lower support rod 14 are in cylindrical structure too. The upper support rod 7 is a hollow cylindrical structure and the lower support rod 14 is a solid cylindrical structure, which reduces the disturbing force of waves and ocean currents to the device, achieves a swing reduction effect and improves the stability of the device. The secondary swing reduction mechanism comprises a plurality of fan-shaped floating cabins 5, a plurality of wing-type supports 4 and a platform deck 2 from the bottom up. While the plurality of fan-shaped floating cabins 5 provides a buoyant force, the water below the water surface 6 in the circular water pond 3 can flow in the clearance between the fan-shaped floating cabins 5, thereby achieving a swing reduction effect in the horizontal direction. The plurality of wing-type supports 4 has a small water-plane-area property and achieves a swing reduction effect in the vertical direction. The fan-shaped floating cabins 5 and the wing-type supports 4 are combined and collaborate to provide an adaptive motion attenuation working face for the platform deck 2, thereby ensuring the stable measurement work of an observation mechanism 1.

As shown in FIG. 1, FIG. 4, FIG. 5, FIG. 6 and FIG. 7, the observation mechanism 1 is placed on the circular platform deck 2. The platform deck 2 has a lower surface connected to the wing-type supports 4. The wing-type supports 4 have a lower end connected to the fan-shaped floating cabins 5. The above members are connected to form a mechanism floating on the water in the water pond 3. The water surface 6 in the water pond covers the fan-shaped floating cabins 5 and the draught depth is within the vertical range of the wing-type supports 4.

As shown in FIG. 2, FIG. 4, FIG. 8 and FIG. 9, the water pond 3 loaded with water is connected to the hollow cylindrical upper support rod 7, a bottom part of the water pond 3 is connected to a circular support platform 8 on the upper support rod 7 through a hollow cylindrical branched support rod 9, so as to reinforce the connection of the water pond 3. A sea surface 25 is within the vertical range of the support rod 7.

Figure 4:
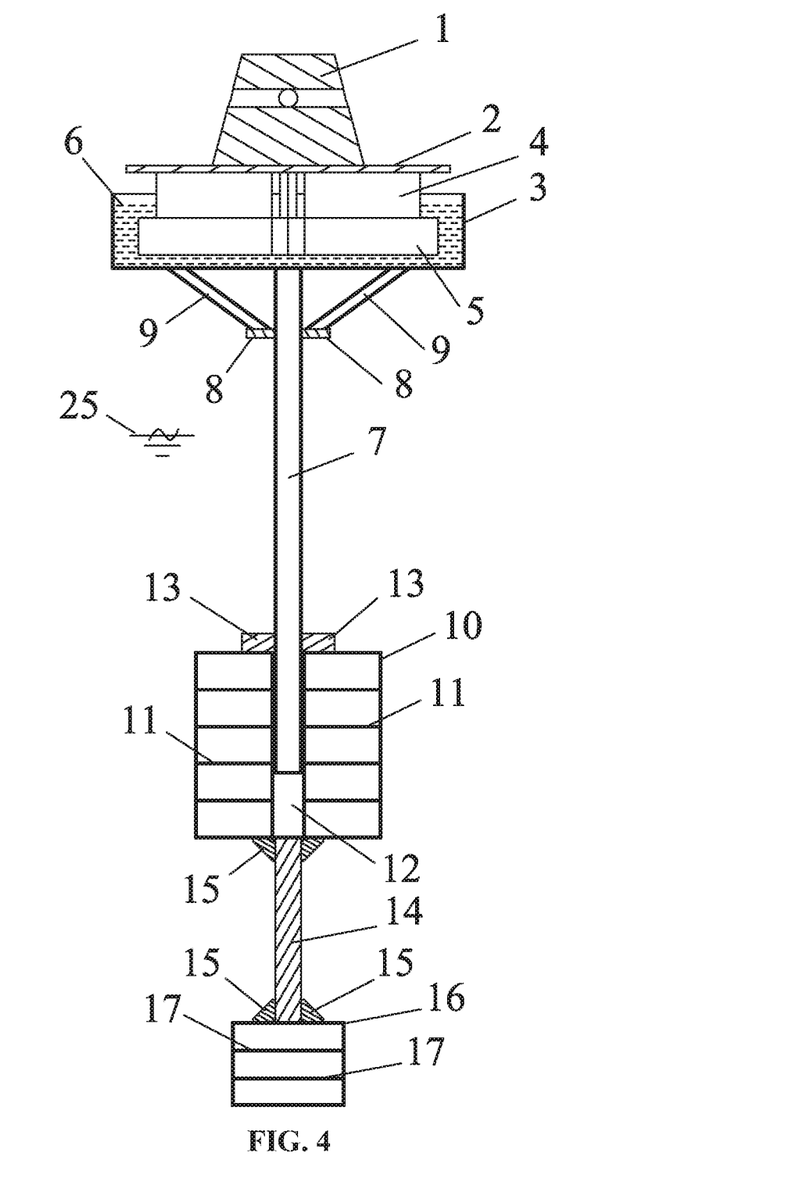
FIG. 4 is a sectional view taken from line A-A in FIG. 3.
Figure 5:
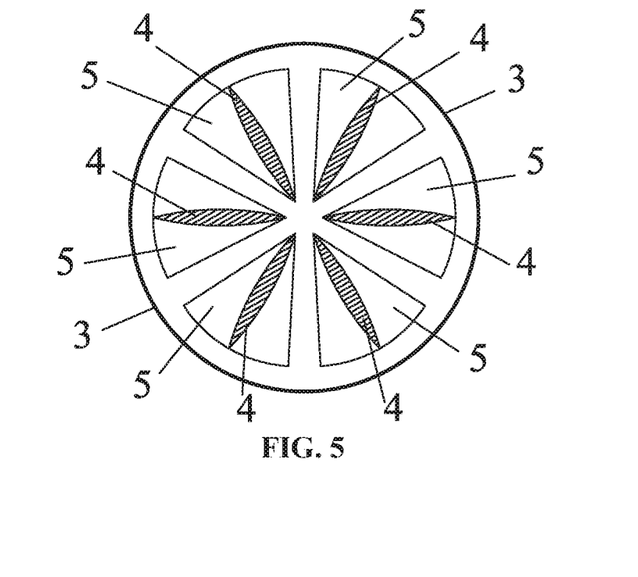
FIG. 5 is a sectional view taken from line B-B in FIG. 3.
Figure 6:
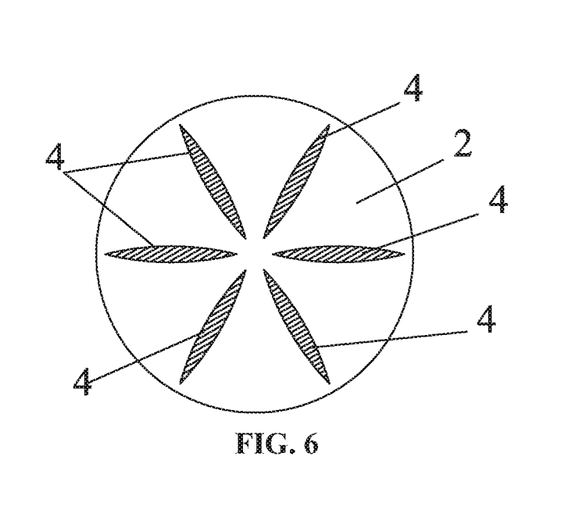
FIG. 6 is a sectional view taken from line C-C in FIG. 3.
Figure 7:
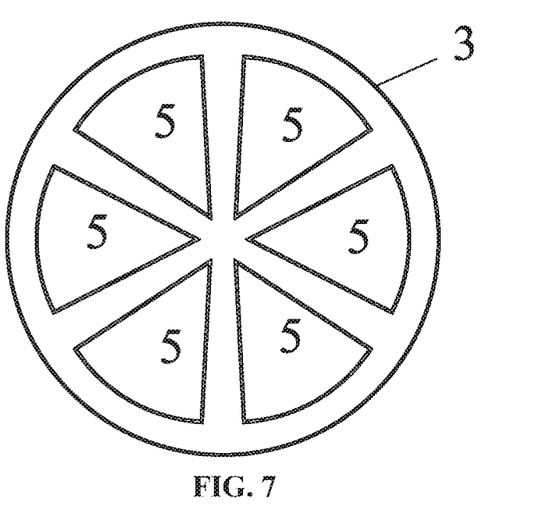
FIG. 7 is a sectional view taken from line D-D in FIG. 3.
Figure 8:
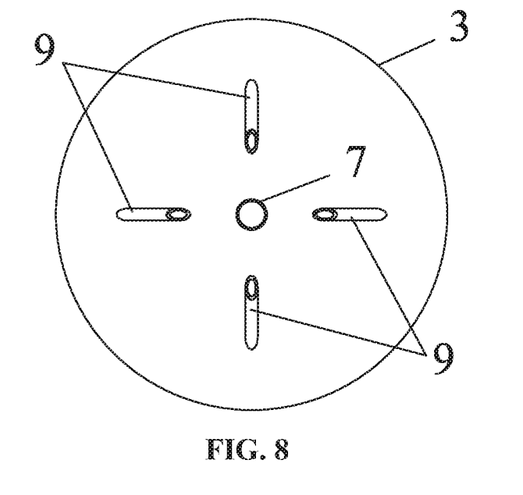
FIG. 8 is a sectional view taken from line E-E in FIG. 3.
Figure 9:
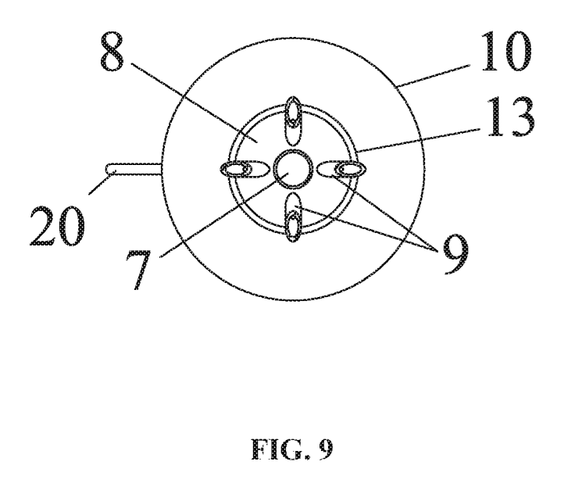
FIG. 9 is a sectional view taken from line F-F in FIG. 3.

As shown in FIG. 4, the upper support rod 7 slides in a central sleeve 12 of the buoyant cabin 10. The length of the upper support rod 7 in the water can be adjusted so as to meet requirements for environmental parameters of different sea conditions. The upper support rod 7 and the buoyant cabin 10 are fastened through a clamp 13. The buoyant cabin 10 is separated into a plurality of independent watertight buoyant cabins horizontally by watertight bulkheads 11, providing the buoyancy of the whole device and realizing buoyancy reserve after damage. The bottom of the buoyant cabin 10 is connected to the counter weight cabin 16 through a lower support rod 14. Triangular brackets 15 are arranged at two ends of the lower support rod 14 in connection with the bottom of the buoyant cabin 10 and the top of the counter weight cabin 16, enhancing the connection strength between the buoyant cabin 10 and the lower support rod 14 and between the counter weight cabin 16 and the lower support rod 14. The counter weight cabin 16 is separated into a plurality of loading cabins by non-watertight bulkheads, to meet requirements for fixed stowage of different mediums.

As shown in FIG. 1, the buoyant cabin 10 and the counter weight cabin 16 have an upper lug 20 and a lower lug 21 connected to cabin sides thereof, respectively. The upper lug 20 and the lower lug 21 are connected to an anchor chain 22 respectively. Another end of the anchor chain 22 is connected to a suction anchor 23 fixed at the sea bottom. The observation platform device floats and works on a water area of a determined range under the action of anchor mooring.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An observation platform device, comprising:
   a platform deck;
   an observation mechanism disposed on the platform deck;
   a primary swing reduction and self-righting mechanism; and
   a secondary swing reduction mechanism;
   wherein
   the primary swing reduction and self-righting mechanism comprises a hollow upper support rod, a solid lower support rod, a buoyant cabin separated by a plurality of watertight bulkheads, and a counter weight cabin separated by a plurality of non-watertight bulkheads;
   the lower support rod comprises a lower end fixedly connected to the counter weight cabin, and an upper end fixedly connected to the buoyant cabin;
   a sleeve is inserted into the buoyant cabin, and the upper support rod comprises a lower end inserted into the sleeve and fixed by a clamp;
   the secondary swing reduction mechanism comprises a water pond, a plurality of wing-type supports, and a plurality of spaced fan-shaped floating cabins;
   the plurality of wing-type supports each comprises an upper end fixedly connected to a lower plane of the platform deck, and a lower end fixedly connected to an upper plane of the fan-shaped floating cabins;
   the upper support rod comprises an upper end fixedly connected to a center of a bottom plane of the water pond;
   the plurality of fan-shaped floating cabins, the plurality of wing-type supports, the platform deck and the observation mechanism floats in water filling the water pond;
   a center of buoyancy of the observation platform device is located above the center of gravity thereof; and
   an anchor chain is connected to an upper lug fixed on the buoyant cabin, a lower lug fixed on the counter weight cabin, and a suction anchor disposed on a sea bottom.

2. The device of claim 1, wherein the plurality of wing-type supports and the plurality of fan-shaped floating cabins are both five in number, and five wing-type supports are evenly distributed along angular bisectors of five evenly distributed fan-shaped floating cabins.

3. The device of claim 1, wherein a water surface in the water pond is higher than an upper surface of the plurality of fan-shaped floating cabins, and is lower than an upper surface of the plurality of wing-type supports.

4. The device of claim 1, wherein a support platform is fixed on the upper support rod, a plurality of branched support rods is connected to the support platform, and a bottom plane of the water pond is supported by the plurality of branched support rods.

5. The device of claim 1, wherein a plurality of brackets is arranged at joints between the lower support rod and the buoyant cabin, and between the lower support rod and the counter weight cabin.

* * * * *